US 12,125,205 B2

(12) United States Patent
Ngo et al.

(10) Patent No.: US 12,125,205 B2
(45) Date of Patent: Oct. 22, 2024

(54) SYSTEMS AND METHODS FOR ACCESSING AND ANALYZING RADIOLOGY IMAGING STUDIES IN REAL-TIME AS THEY ARE BEING REVIEWED BY A PRACTITIONER

(71) Applicant: Covera Health, New York, NY (US)

(72) Inventors: Lawrence Ngo, Durham, NC (US);
Brian Blanchette, Boulder, CO (US);
Jacob Johnson, Sherwood, WI (US);
Thomas Craig, Long Beach, CA (US);
Hongyi Zhang, Dallas, TX (US)

(73) Assignee: Covera Health, New York, NY (US)

( * ) Notice: Subject to any disclaimer, the term of this patent is extended or adjusted under 35 U.S.C. 154(b) by 0 days.

(21) Appl. No.: 18/388,747

(22) Filed: Nov. 10, 2023

(65) Prior Publication Data
US 2024/0169526 A1 May 23, 2024

Related U.S. Application Data

(60) Provisional application No. 63/427,104, filed on Nov. 22, 2022.

(51) Int. Cl.
*G06T 7/00* (2017.01)
*G06F 40/20* (2020.01)

(52) U.S. Cl.
CPC ............ *G06T 7/0012* (2013.01); *G06F 40/20* (2020.01); *G06T 2200/24* (2013.01); *G06T 2207/10116* (2013.01); *G06T 2207/20081* (2013.01); *G06T 2207/30096* (2013.01); *G06T 2207/30168* (2013.01)

(58) Field of Classification Search
CPC ............... G06T 7/0012; G06T 2200/24; G06T 2207/10116; G06T 2207/20081; G06T 2207/30096; G06T 2207/30168; G06F 40/20
See application file for complete search history.

(56) References Cited

U.S. PATENT DOCUMENTS

| 2016/0147971 A1* | 5/2016 | Kolowitz | G06F 3/0482 |
| | | | 715/753 |
| 2017/0200270 A1* | 7/2017 | Reicher | G06T 15/08 |
| 2020/0311938 A1* | 10/2020 | Vincent | G16H 30/20 |
| 2020/0367853 A1* | 11/2020 | Yoo | A61B 8/085 |

(Continued)

OTHER PUBLICATIONS

Erdal et al., "Radiology and Enterprise Medical Imaging Extensions (Remix)", J Digit Imaging (2018) 31, pp. 91-106 (Year: 2018).*

*Primary Examiner* — Ping Y Hsieh
*Assistant Examiner* — Jose M Torres
(74) *Attorney, Agent, or Firm* — Outlier Patent Attorneys, PLLC

(57) ABSTRACT

The present disclosure is for a system and a method for artificial intelligence (AI) based review of radiologic images as they are being read by a radiologist. The AI review is performed through the use of screen sharing and screen capture approaches allowing an AI model to analyze images without direct access to the raw image files. The AI review may compare user documented findings with AI model-based findings in order to identify discrepancies between the two. The discrepancies can be used as feedback for retraining the model and/or as feedback to the user to aid in education or track and/or improve an individual's review characteristics.

20 Claims, 9 Drawing Sheets

(56) References Cited

U.S. PATENT DOCUMENTS

| | | | |
|---|---|---|---|
| 2021/0224991 A1* | 7/2021 | Yoo | A61B 8/467 |
| 2023/0089026 A1* | 3/2023 | Tran | G06T 7/0012 |
| | | | 705/2 |

* cited by examiner

SYSTEMS AND METHODS FOR ACCESSING AND ANALYZING RADIOLOGY IMAGING STUDIES IN REAL-TIME AS THEY ARE BEING REVIEWED BY A PRACTITIONER

CROSS-REFERENCE TO RELATED APPLICATIONS

This application claims the benefit of U.S. Provisional Application 63/427,104, filed Nov. 22, 2022, titled "SYSTEM AND METHOD FOR REAL-TIME ANALYSIS OF USER READING CHARACTERISTICS OF RADIOLOGY IMAGING STUDIES," which is herein incorporated by reference in its entirety.

BACKGROUND

Field of the Art

This invention relates to analysis of radiology imaging studies. More specifically, the invention relates to artificial intelligence (AI) based review of radiology imaging studies in real-time as they are being reviewed by a clinician.

Discussion of the State of the Art

The application of artificial intelligence (AI) in radiology seeks to augment the capabilities of radiologists by providing enhanced data analysis, leading to potentially more accurate and rapid diagnostics. Despite the advancements, the deployment of AI algorithms within the clinical radiological environment has encountered substantial obstacles.

Current methods for integrating AI in radiology are largely based on direct integration with hospital IT systems' data streams. These data streams are proprietary and complex, which makes the deployment of AI algorithms a difficult and technical challenge. It often necessitates interfacing with a multitude of data formats and structures across different hospital environments.

The direct integration approach is invasive and requires a consensus among multiple stakeholders, which includes meeting business, legal, and technical standards. This process may also demand the installation of dedicated hardware within the hospital's data stream infrastructure.

Integrating AI into the hospital's data streams raises significant concerns about patient privacy and data security. Ensuring that patient data is not inappropriately transmitted or stored is of paramount importance, yet adds to the complexity and risk of current AI deployment methods.

Each hospital's IT environment is unique, which necessitates custom implementation for each AI deployment. This individualized approach is resource-intensive and results in protracted installation periods, sometimes extending from months to years. The long sales cycle and the extensive resource allocation required for implementation significantly slow down the adoption rate of AI in radiology.

Radiological reporting requires precise measurement and identification of anomalies, a process that can be time-consuming. Current solutions provide support for such tasks but are generally not automated within the workflow, potentially leading to inefficiencies.

Ultimately, the existing solutions for deploying AI in radiology present several significant challenges, including complex system integration, privacy concerns, prolonged implementation times, and stakeholder alignment. These issues highlight the need for a more streamlined and less invasive approach to integrating AI into radiological workflows.

SUMMARY

The invention detailed in the application addresses the challenge of efficiently integrating artificial intelligence (AI) with radiological image analysis without the need for invasive IT integration. This is achieved through a system that enables the simultaneous display of raw imaging data and AI-generated analyses on a radiologist's workstation.

The system comprises several key technological components that work in concert. The primary component is a screen-sharing capability that captures pixel values from radiological images in real-time, storing a subset of these values as needed. This functionality facilitates the retention of image data for subsequent AI analysis without direct integration into hospital data streams.

A compact AI model is embedded within the memory of a web browser. This model is designed to fit within the RAM limitations of standard computer workstations and formatted for browser compatibility. The AI processes the captured pixel data to produce diagnostic outputs.

The described invention is accessible through a standard web browser, eliminating the need for specialized software installations. It operates by capturing screen data, with the user's permission, and utilizes a vision AI algorithm to detect pathologies.

The generated outputs are then presented to the user via a non-intrusive overlay on the existing radiology interface. This overlay is designed to be vendor-neutral and does not require modifications to existing hospital systems or additional plugin installations, which allows for easy adoption across various radiological environments.

Furthermore, the system includes an automatic feature for lesion segmentation and measurement, providing text-based reports that mimic traditional radiological assessments. This feature provides multiple benefits including providing an extra analysis to help catch potential human oversights and improve diagnostic accuracy and/or provide educational information to improve future diagnostic accuracy, and potentially reducing the manual effort required for lesion analysis, thereby streamlining the reporting process.

The system also incorporates functionalities for real-time quality and efficiency assessments, including tracking the velocity of image review by the radiologist and providing metrics on time allocation per anatomical area.

In essence, the invention provides a tool for radiologists that integrates AI analysis into their workflow in a non-invasive manner, streamlining the diagnostic process while maintaining data privacy and system integrity.

The present invention provides a unique solution to the above identified problems and/or shortcomings of conventional approaches. The present invention applies screen sharing approaches to transmit limited data from a user device to a central processing server or computing system for use in AI based diagnostic analysis and practitioner quality analysis. The invention involves obtaining pixel data in real-time via screen sharing technology as a practitioner is reviewing an imaging study and documenting study findings. The real-time pixel data is processed via AI to identify findings of interest as determined by an AI model. The AI based findings are compared with findings documented by a practitioner to identify findings missed by the practitioner which may be used in determining a practitioner quality metric. The results of the comparison may be provided to a practitioner in real-time so they can review the AI based findings for learning purposes and/or to corroborate the findings and update their report accordingly. The pixel data may also be used to quantify imaging study reading characteristics unique to a practitioner in real-time, which may be compared against the practitioner's historical reading characteristics and/or the reading characteristics of a group of the practitioner's peers/colleagues. Such analysis provides the benefit of alerting practitioners when they have diverged from their normal reading characteristics which may serve as an early indicator that they are prone to potential errors, oversights, or misdiagnoses. Moreover, this analysis informs a practitioner where they stand in relation to their peers which may serve as an indicator of areas where the practitioner could improve their reading performance.

Performing the AI analysis as the user is reading an imaging study via a central processing system is an unconventional approach as this comes with numerous technical challenges which must be overcome. Some of the challenges include providing a remote AI analysis system access to the images without data transfer of the full imaging study to the AI analysis system, maintaining confidentiality and protecting personally identifiable information associated with the imaging studies, analyzing image data in a, generally, degraded or less than the best possible format, uncertainty around how AI algorithms will perform on the lower quality format, whether the AI algorithms will be able to achieve acceptable/valid outcomes when using lower quality source data which are problems that conventional systems do not encounter.

Accordingly, some embodiments may provide multiple technological advantages over prior art systems. In addition, various embodiments may provide improvements in computing technology and technological features, for instance, by providing downstream AI processing which not only identifies findings of interest, but simultaneously determines practitioner reading characteristics useful for evaluating and improving practitioner quality and efficiency. Such embodiments may improve, inter alia, the efficiency of computing systems managing automated analysis of imaging studies in a manner requiring less processing resources due to only needing to obtain and process limited pixel data as opposed to full imaging studies. One non-limiting example of a technological advantage may include providing an improved user experience for users attempting to read radiology imaging studies in an efficient and accurate manner by providing users with real-time feedback regarding the quality and/or efficiency of their current reading characteristics. Another non-limiting example of a technological advantage may include providing a platform for assessing individual practitioners relative to their past performance and notifying individuals, in real-time, of diverging trends in their personal review characteristics which may be useful in preventing practitioner errors and oversights. A further non-limiting example of a technological advantage may include providing a platform where individual practitioners can be assessed relative to their peers and provided with real-time feedback regarding their imaging study reading characteristics relative to those of peers which may be useful in identifying areas for improvement. An additional non-limiting example of a technological advantage may include determining real-time quality metrics instead of only relying on indicators after the fact, such as malpractice occurrences, as indicators of the need to address quality.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
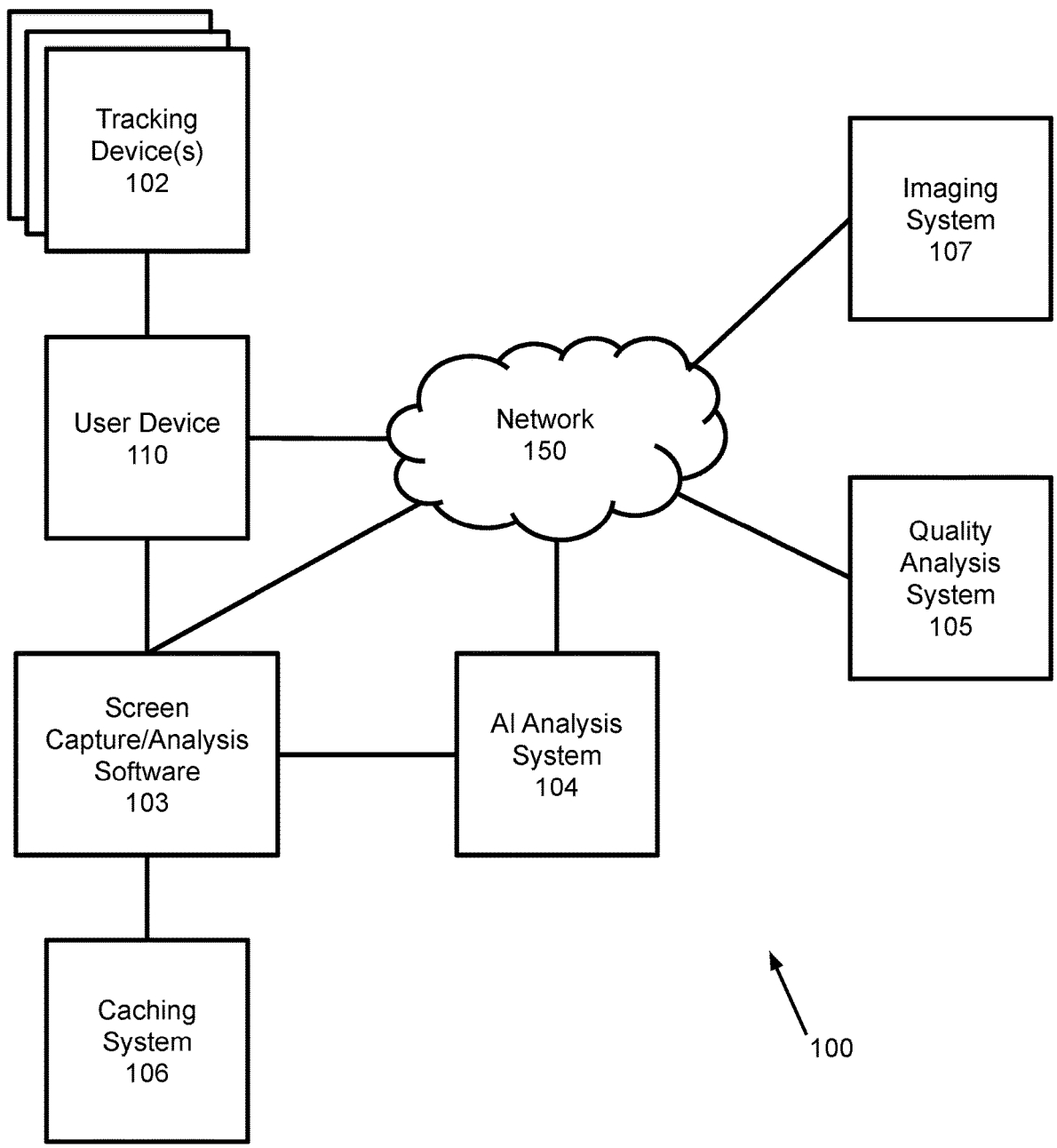
FIG. 1 illustrates a system for an image reading tracking and analysis in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates an exemplary embodiment of an image reading tracking and analysis system 100 according to one embodiment. The system includes imaging system 107, user device(s) 110, screen capture/analysis software 103, AI analysis system 104, quality analysis system 105, caching system 106, tracking device(s) 102, and a network 150 over which the various systems communicate and interact. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

As a general overview, imaging system 107 is operable to provide imaging studies (e.g. diagnostic imaging tests) of patient anatomy for review by a user (e.g. a radiologist) via user device 110 and processing by an artificial intelligence (AI) analysis system 104. While a radiologist is reviewing the imaging study(ies) via user device 110, screen capture/analysis software 103 operates to share user interaction data associated with a display screen with at least one of AI analysis system 104 and quality analysis system 105 for use in determining metrics associated with at least one of user efficiency characteristics (e.g. total time to read a study, speed at which study images are reviewed, comparison with peers/colleagues, etc.) and user quality characteristics (e.g. identifying all relevant findings, accuracy of findings, etc.).

Imaging system 107 generally comprises any medical imaging system operable to generate images of patient anatomy. Exemplary imaging systems include, but are not limited to, magnetic resonance imaging (MRI) systems, computed tomography (CT) systems, ultrasound systems, X-ray systems, nuclear imaging systems (e.g. positron emission tomography (PET)), and optical coherence tomography (OCT) systems. These are merely exemplary imaging systems and other imaging systems as well as various imaging techniques associated with these or other imaging systems may be used without departing from the scope of the invention as would be apparent to one of ordinary skill in the art.

User device(s) 110 generally comprises a computing device comprising, or otherwise associated with, a display screen for displaying images obtained by imaging system 107. User device(s) 110 is operable to execute at least one application associated with screen sharing or screen capture of images being displayed for review by a user (e.g. a radiologist). User device(s) 110 are described in more detail below.

Screen capture/analysis software 103 is operable to obtain shared display screen information associated with user device(s) 110, such as pixel values associated with images being reviewed by a user. In one aspect, screen capture/analysis software 103 may comprise a web-based application (e.g. a browser plugin or extension) operable to capture information being displayed on a display screen associated with user device(s) 110. In one aspect, screen capture/analysis software 103 comprises a user device based executable application operable to capture and/or share displayed information for use in further analysis. Screen capture/analysis software 103 is operable to provide obtained screen information (e.g. pixel values) associated with the entire display area and/or at least one sub-portion thereof. Screen capture/analysis software 103 is operable to provide obtained screen information (e.g. pixel values) to at least one of AI analysis system 104 and quality analysis system 105 for further processing and analysis.

AI analysis system 104 is operable to execute automated and/or semi-automated analysis of obtained screen capture information (e.g. pixel values). AI analysis system 104 may apply at least one image or data processing algorithm designed to automatically assess the image(s) being reviewed via user device. For example, AI analysis system 104 may perform at least one of identifying items of interest present in the image(s) being reviewed via user device such as anatomy being reviewed, locations of any abnormalities (e.g. lesions, fractures, etc.), determining measurements of identified items, and generating indicators (e.g. bounding boxes) associated with the identified items for display (e.g. overlay) on the image(s). In one aspect, whenever an item of interest is identified by AI analysis system 104, this image (generated from the pixel value data) and the associated AI analysis system generated indicators may be flagged and provided to caching system 106 for later use (e.g. presentation to a user). AI analysis system 104 may determine or identify information associated with user input such as documentation of findings, measurements made, etc. For example, AI analysis system 104 may extract text and/or alphanumeric information (e.g. user input of findings/measurements, etc.) from the obtained screen capture information for comparison with AI generated findings. AI analysis system 104 is operable to perform real-time screen capture information processing as a user (e.g. radiologist) is reviewing an imaging study and generate additional data and/or metrics in real-time for at least one of comparison with the user findings and presentation of the AI findings as they are generated and/or on demand from the user such as upon the user completing a reading of a given study. In this way a user is provided with real-time feedback regarding the status of their reading with respect to AI generated findings so that a user can determine if they may have missed a finding or item of interest when reading the imaging study.

Quality analysis system 105 is operable to determine user study reading characteristics comprising at least one of user efficiency and user quality (or accuracy) associated with the user's image study reading performance. Quality analysis system 105 is operable to provide real time feedback regarding quality/accuracy and/or efficiency characteristics as the imaging study is being reviewed in order to notify users in real-time of their real-time performance. Such may be beneficial in educating a user about the areas for improvement in their reading performance.

User quality (or accuracy) may comprise metrics and/or indicators associated with user documented findings with respect to AI generated findings. For example, if a user identified/documented all findings detected by AI analysis system 104 for a given imaging study, then the quality analysis system 105 may associate a high score or metric with the user for that study reading. Conversely, if a user missed one or more findings identified by AI analysis system 104, then the quality analysis system 105 may associate a lower score or metric with the user for that study reading. User efficiency may comprise metrics and/or indicators associated with user study reading characteristics relative to at least one of threshold/expected reading characteristics. User study reading characteristics relative to threshold/expected reading characteristics may comprise at least one of a threshold/expected reading duration (i.e. time to complete the study reading) and speed (e.g. speed at which the user scrolls through the study images). User study reading characteristics may be categorized based on at least one of study type and anatomical features present in the study. User study reading characteristics may comprise metrics and/or indicators of a user's performance relative to peer/colleague reading characteristics.

Quality analysis system 105 may compare at least one of the above-mentioned characteristics for a given user with the same characteristics for one or more peers. For example, quality analysis system 105 may determine a difference between at least one of a user's overall quality/accuracy, a user's quality/accuracy associated with a particular anatomy (e.g. liver) and/or particular finding (e.g. liver lesions), the duration or rate at which a user completes study readings, and the duration or rate at which a user reads images associated with a particular anatomy and/or particular finding as compared to that of the user's peers. In this way, user performance may be evaluated in order to identify areas for improvement relative to the user's peers. In one aspect, quality analysis system is operable to determine user study reading characteristics (e.g. efficiency and/or quality/accuracy) relative to user based thresholds or expectations determined from past user reading data such that quality analysis system 105 is operable to determine if a user is reading faster/slower than their typical or historical reading characteristics or more/less accurately than historical reading characteristics. In this way, user performance may be evaluated in order to identify any sudden, unusual, and/or unexpected changes in user performance which may provide an indication of the need for intervention if user performance is substantially below that which is typical for the user.

Caching system 106 is operable to obtain information from at least one of the AI analysis system 104 (e.g. in real time as the AI analysis system analyses obtained screen capture information) and the quality analysis system 105 and store the information for later presentation to a user. Caching system 106 is operable to update what is stored as a user reviews the study and registers/documents findings. For example, caching system 106 may initially store all images of a given study where AI analysis system detects a finding of interest. As a user reviews the study and records their findings, any images containing a finding of interest which are associated with a user documented finding may be removed from the storage in the caching system 106 or have the associated flag removed. Alternatively, caching system 106 may only store images and associated AI findings associated with that which has been determined to have been overlooked by a user after completion of the study. For example, via the flagging described above, any images containing a finding of interest may be flagged by AI analysis system, wherein the flags are removed if the user documents the finding associated with the flagged image. Upon user completing the reading of the study, any images still associated with a flag may be stored by caching system 106. Although depicted as a separate component, caching system 106 may be incorporated into Tracking device(s) 102 may comprise external tracking systems or devices for evaluating user interaction with user device. For example, an eye tracking system(s) may be used to track where a user is looking as they are reading a study. In this way, information associated with where a user is focusing their attention may be associated with the obtained screen capture information in order to provide additional information for use in evaluating user reading characteristics described above.

User device(s) 110, as described briefly above, generally include a computer or computing device including functionality for communicating (e.g., remotely) over a network 150.

Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2A:
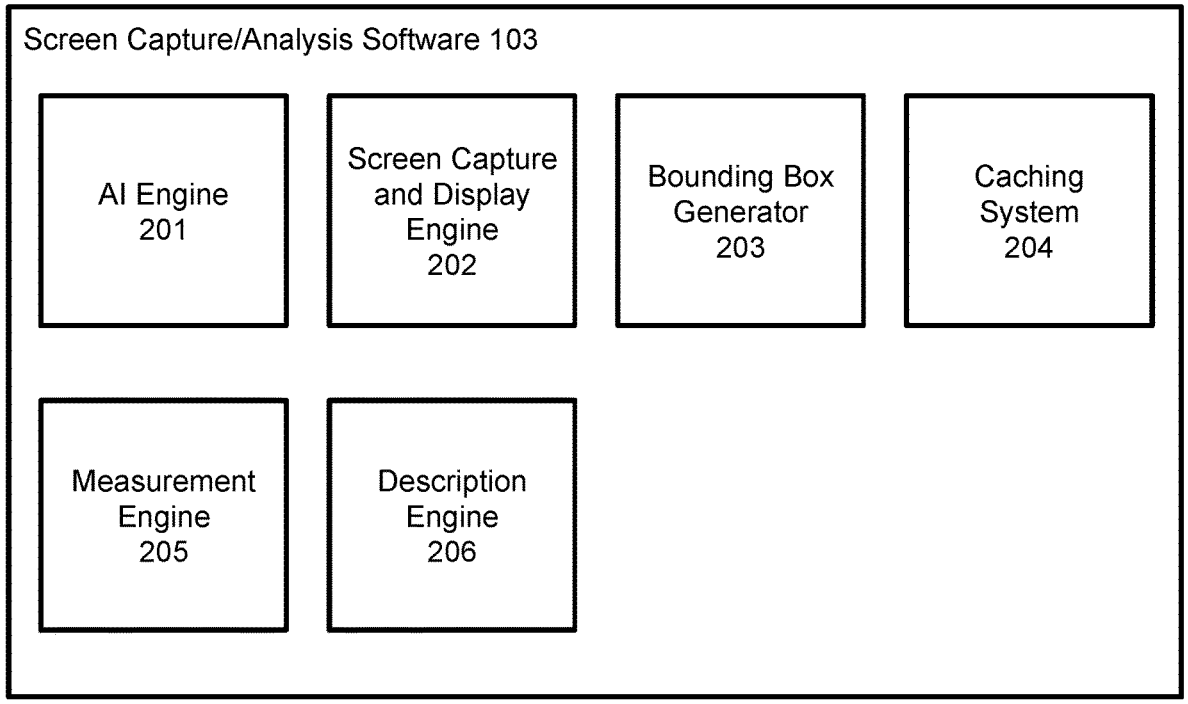
FIG. 2A illustrates a system/software for screen capture/analysis in accordance with an exemplary embodiment of the present invention.

FIG. 2A illustrates an exemplary embodiment of the screen capture/analysis software 103 which comprises AI engine 201, screen capture and display engine 202, bounding box generator 203, caching system 204, measurement engine 205, and description engine 206. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

AI engine 201 is operable to communicate with AI analysis system. AI engine 201 may determine pixel values from screen capture information and provide the pixel value data to AI analysis system for further processing. AI engine 201 is operable to obtain information from AI analysis system associated with AI system processing (e.g. identified items of interest, measurements, etc.) for presentation to a user and/or storage in a caching system.

Screen capture and display engine 202 is operable to obtain screen capture information and provide screen capture information to at least AI engine 201. In one aspect, screen capture and display engine 202 is operable to mirror the display screen of a user device on a separate screen and display additional information associated with information from AI engine 201 (e.g. results of AI analysis system processing). In one aspect, screen capture and display engine 202 is operable to pre-process screen capture information to remove confidential information such as personally identifiable information.

Bounding box generator 203 is operable to generate a bounding box for display on a user device or associated display screen based on information obtained from AI analysis system. For example, bounding box generator 203 may obtain coordinates within an image where a finding of interest is present and generate a bounding box based on these coordinates for display over the image of interest in order to indicate where in the image the finding of interest is located. Bounding box generator 203 is operable to obtain an indication from AI analysis system regarding which image(s) in a stack or series of images are associated with a finding of interest and thus should have a bounding box generated for display with the corresponding image(s). In one aspect, bounding box generator 203 is operable to generate bounding boxes for display on a mirror of the user display via screen capture and display engine 202.

Caching system 204 is operable to store information associated with findings of interest obtained via AI engine 201 from AI analysis system. Caching system 204 may store at least one of: images having an AI detected finding of interest, an indicator of which image(s) in a stack are associated with an AI detected finding of interest, bounding box information (e.g. coordinates) for AI detected findings of interest, AI generated measurements, and AI generated descriptions of findings of interest.

Measurement engine 205 is operable to detect measurements made by a user during the reading of an imaging study. In one aspect, measurement engine 205 may identify, in real-time, measurements as they are being made, such as via cursor tracking and mouse input or touchscreen interactions. Measurement engine 205 may provide detected measurement information for further analysis such as via quality analysis system 105.

Description engine 206 is operable to detect descriptions made by a user during the reading of an imaging study. In one aspect, description engine 206 may identify, in real-time, descriptions as they are being made, such as via keyboard input or touchscreen input. In one aspect, description engine 206 is operable to detect text input at certain screen locations such as a designated portion of the screen where a user is documenting their findings. Description engine 206 may provide detected description information for further analysis such as via AI analysis system 104 and/or quality analysis system 105.

Figure 2B:
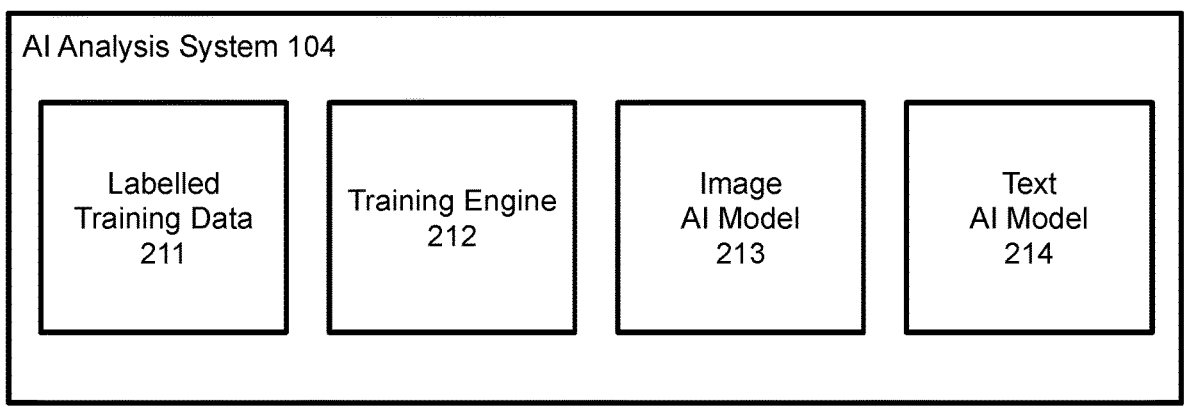
FIG. 2B illustrates an AI analysis system in accordance with an exemplary embodiment of the present invention.

FIG. 2B illustrates an exemplary embodiment of the AI analysis system 104 which comprises labeled training data 211, training engine 212, image AI model 213, and text AI model 214. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

Labeled training data 211 may comprise a plurality of images and/or imaging studies which have undergone a labeling process to label pixel data as being associated with specific anatomical structures, body fluids (e.g. blood, cerebrospinal fluid, lymph, urine, etc.), air space, and/or abnormalities (e.g. lesions, fractures, tears, abnormal anatomy/growth, etc.). Labeled training data 211 may comprise text data such as common phrases, text strings, and/or terminology used in diagnosing abnormalities or documenting the findings of an imaging study.

Training engine 212 is operable to train at least one of an image AI model and a text AI model using labeled training data and machine learning techniques (e.g. neural networks). Training engine 212 may train at least one image AI model such that the image AI model is able to automatically analyze an image and identify at least one of anatomy and abnormalities with a sufficient degree of accuracy. Training engine 212 may train a plurality of image AI models based on imaging study type. For example, training engine 212 may train one image AI model for use with MRI studies and a different image AI model for use with CT studies. These are merely exemplary and any number of AI models may be trained depending on the source of the labeled training data and the intended imaging study type for which the AI model is intended to be used. Training engine 212 is operable to train at least one text AI model such that the text AI model is able to automatically analyze text associated with user documented analysis of an imaging study in order to identify the relevant text of interest associated with imaging study findings.

Image AI model 213 is operable to, given an image or stack of images, generate output indicative of features present in the image or image stack (e.g. anatomical structures, lesions/abnormalities). Image AI model 213 may generate output associated with at least one of detected anatomy present in the study, detected abnormalities present in the study, and measurements of the detected items. Image AI model 213 is operable to identify particular findings of interest such as abnormalities and the corresponding coordinates within an image or image stack where the features of interest are located.

Text AI model 214 is operable to, given text data associated with user documented findings from an imaging study reading, identify the relevant text of interest pertaining to imaging study findings. In one aspect, text AI model may use output information from image AI model in identifying text of interest. For example, image AI model output indicating the presence of a liver lesion may be used by text AI model in identifying text data of interest associated with liver lesion findings present in user documented findings.

Figure 2C:
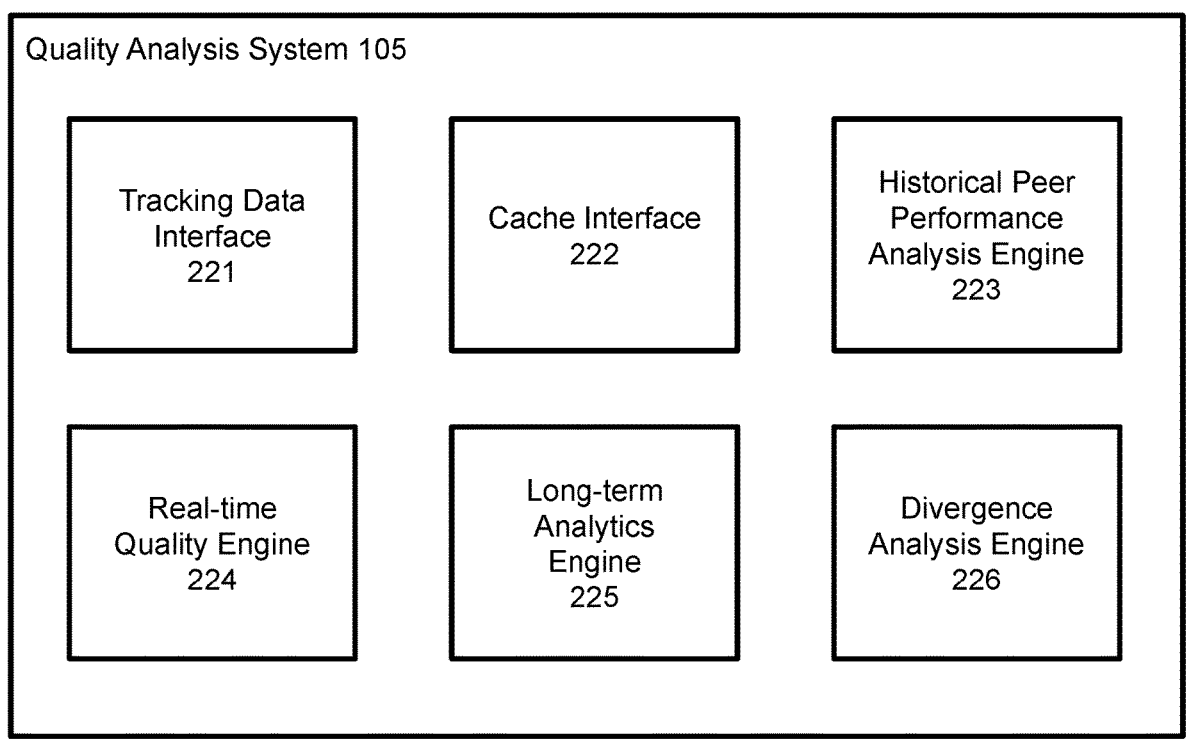
FIG. 2C illustrates a system for quality assessment in accordance with an exemplary embodiment of the present invention.

FIG. 2C illustrates an exemplary embodiment of the quality analysis system 105 which comprises tracking data interface 221, cache interface 222, historical peer performance analysis engine 223, real-time quality engine 224, long term analytics engine 225, and divergence analysis engine 226. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

Tracking data interface 221 is operable to obtain input data associated with at least one of screen capture/analysis software and tracking device(s) for use in comparison with AI generated findings. Tracking data interface 221 may obtain at least one of pixel values associated with images being reviewed by a user and user input or user interaction with a user device. Tracking data may comprise at least one of user documented findings (e.g. detected items, corresponding measurements, etc.) and associated images where the findings were present.

Cache interface 222 is operable to obtain information stored in a caching system (e.g. caching system 106). Cache interface 222 may obtain images stored in a caching system where the cached images contain a finding of interest detected by AI analysis system. Cache interface may obtain additional information including at least one of the coordinates within an image indicating the location where a finding of interest was detected by AI analysis system, measurements of the features of interest, and AI generated description(s) of the AI detected findings. In one aspect cache interface 222 only obtains cached information associated with findings of interest which were not identified by a user while reviewing an imaging study.

Historical peer performance analysis engine 223 is operable to evaluate image study reading characteristics for a plurality of different users and compile metrics associated with at least one group of individuals from among the plurality of different users. In one aspect, the group of individuals may comprise a plurality of peers associated with a current user whose quality is being assessed. Historical peer performance analysis engine 223 may determine metrics for a group of individuals such as the average duration to complete an image study reading, average speed at which the group of individuals move through an image stack associated with the imaging study, and average quality or accuracy of the group of individuals (e.g. how frequently the group documents every AI detected finding or how frequently the group misses an AI detected finding), any of the above which may be categorized based on imaging study type, anatomy, and/or abnormality type. These are merely exemplary group metrics and other metrics may be used as would be apparent to one of ordinary skill in the art. Historical peer performance analysis engine 223 is operable to compare the reading characteristics of a current user with the metrics for a group of individuals in order to provide the user with feedback regarding their performance relative to their peers. For example, historical peer performance analysis engine 223 may provide the current user with an indication that they are reading the given image study type (or anatomy) at a substantially faster (or slower) rate than their peers. As another example, historical peer performance analysis engine 223 may provide the current user with an indication that they are less accurate (e.g. miss more AI detected findings) than their peers when reading imaging studies of a given type. These are merely exemplary comparisons and feedback which the can be provided and other comparisons may be performed by historical peer performance analysis engine 223 without departing from the scope of the invention as would be apparent to one of ordinary skill in the art.

Real-time quality engine 224 is operable to generate a real-time quality indication for a user actively reviewing an imaging study. In one aspect, real-time quality engine 224 may generate a score or metric indicating the quality (or accuracy) of the user's current imaging study reading characteristics. The quality (or accuracy) may be determined by comparing user generated findings with AI generated findings in order to identify and/or quantify the differences present. Real-time quality engine 224 may provide the real-time quality analysis results to the user as the imaging study is being read or upon completion of the reading of the imaging study so that the user is provided with feedback regarding their performance and/or review anything that was missed and update their report should they agree with the AI findings.

Long term analytics engine 225 is operable to determine individual user imaging study reading characteristics over time. Long term analytics engine 225 may determine typical (e.g. average) reading characteristics for a given user over an extended period of time (e.g. weeks, months, etc.). Long term metrics may comprise typical quality and/or efficiency metrics.

Divergence analysis engine 226 is operable to compare current (real-time) user reading characteristics with long term metrics from long term analytics engine 225 to determine if the user's real-time reading characteristics are deviating from their normal or typical characteristics. Divergence from a user's norms may provide an indication that the user may want to modify their current reading approach. For example, if a user is reading substantially faster than they normally would (based on long term analytics data), divergence analysis engine 226 may detect this and provide an indication of such to the user. In one aspect, this may comprise a recommendation to the user, such as to slow down and ensure that they are reading properly. As another example, if a user is reading substantially slower than they normally would (based on long term analytics data), divergence analysis engine 226 may detect this and provide an indication of such to the user. In one aspect, this may comprise a recommendation to the user, such as to take a break and then refocus on reading.

Figure 3A:
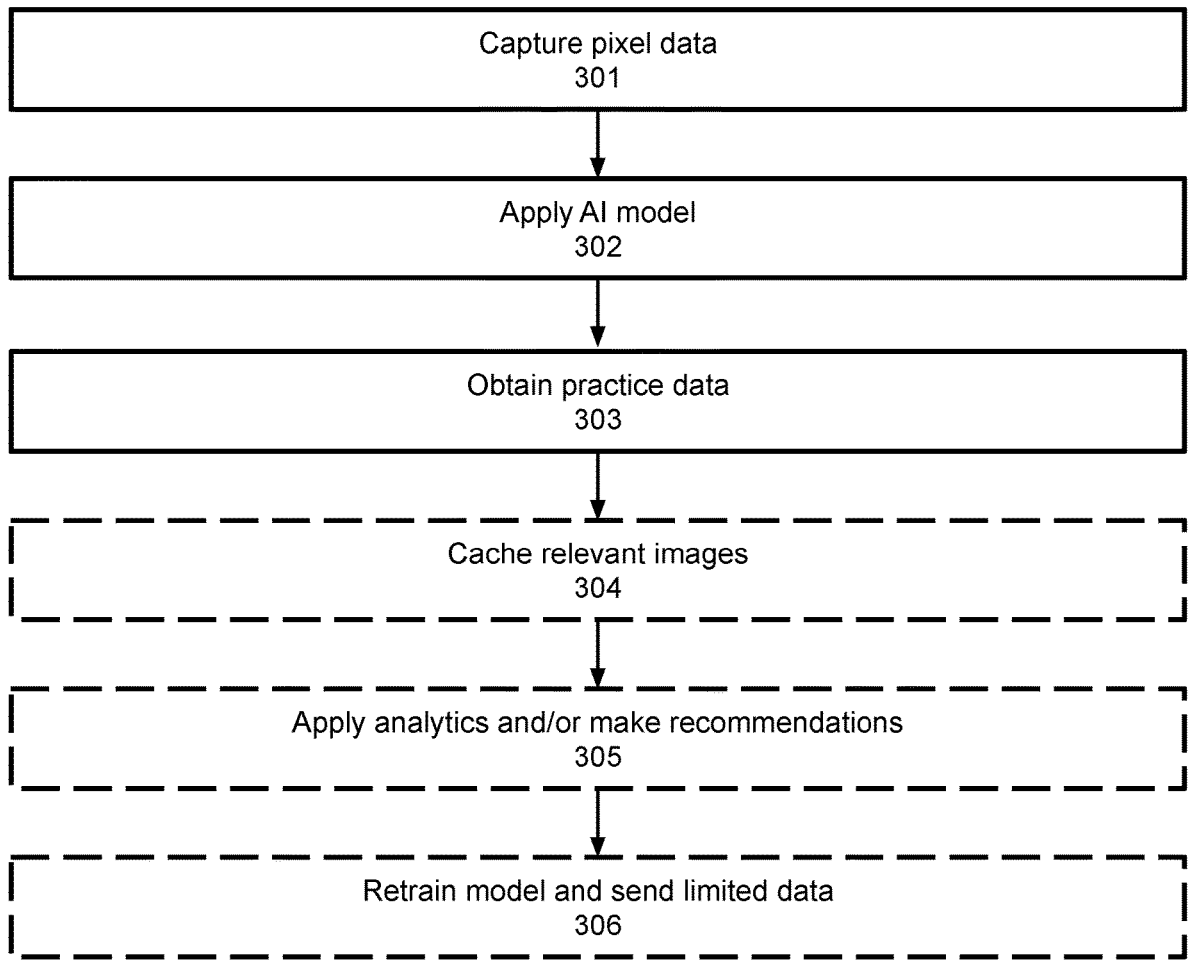
FIG. 3A illustrates an exemplary process for real-time analysis of practitioner imaging study reading characteristics according to one embodiment of the invention.

FIG. 3A illustrates an exemplary process for real-time analysis of practitioner imaging study reading characteristics according to one embodiment of the invention. The process comprises capturing pixel data 301, applying AI model(s) 302, obtaining practice data 303, caching relevant images 304, applying analytics and/or making recommendations 305, and retraining the AI model(s) and sending limited data 306. The process may comprise additional steps, fewer steps, and/or a different order of steps without departing from the scope of the invention as would be apparent to one of ordinary skill in the art.

At step 301 the process comprises capturing pixel data. Capturing pixel data may comprise obtaining pixel data via screen capture software such as screen capture/analysis software 103 described above. The pixel data may be associated with images of at least one imaging study being reviewed by a user (e.g. a radiologist) on a user device which has authorized screen sharing. The pixel data may be associated with text information such as user documented findings associated with an imaging study being reviewed by the user on the user device.

At step 302, the process comprises applying AI model(s) to the obtained pixel data. The AI model(s) are operable to process the obtained pixel data to identify findings of interest present in the images associated with the pixel data. Findings of interest may comprise at least one abnormality (e.g. lesions, fractures, enlarged/oversized anatomical structures, etc.) present in the images. AI model(s) may be operable to determine measurements of the detected abnormalities.

At step 303, the process may comprise obtaining practice data. Practice data may comprise user documented findings associated with the reading of an imaging study. User documented findings may comprise at least one of diagnostic terminology indicating any abnormalities detected, terminology indicating everything appeared normal or within expected tolerances, and/or measurements associated with the abnormalities.

At step 304, the process may comprise caching relevant images 304. Caching relevant images may comprise caching one or more (potentially all) images where the AI model(s) identified a finding of interest. Caching relevant images may comprise caching only images where the AI model(s) identified a finding of interest that was not documented by the user. This may comprise applying analytics to the output of the AI model(s) and obtained practice data in order to identify which findings of interest the AI model(s) identified that the user failed to document.

At step 305, the process may comprise applying analytics and/or making recommendations 305. Analytics may comprise determining, in real-time, at least one of user efficiency and user quality metrics. User efficiency metrics may comprise a comparison of current user reading characteristics with at least one of historical (e.g. long term) user reading characteristics and historical peer reading characteristics in order to identify if the user is diverging from expected norms. User quality metrics may comprise a comparison of current user documented findings with AI model identified findings At step 306, the process may comprise retraining the AI model(s) and sending limited data. The process may comprise employing model retraining approaches, such as federated learning to retrain the AI model(s). In one aspect, this may comprise obtaining information associated with user reading an imaging study (e.g. user documented measurements of abnormalities) which is used to train a model locally at the user device and if a change is determined between the locally trained model and the central AI model, send limited data such as the differences between models (e.g. locally trained model weights) to an AI analysis system for use in updating or retraining the central model.

Figure 3B:
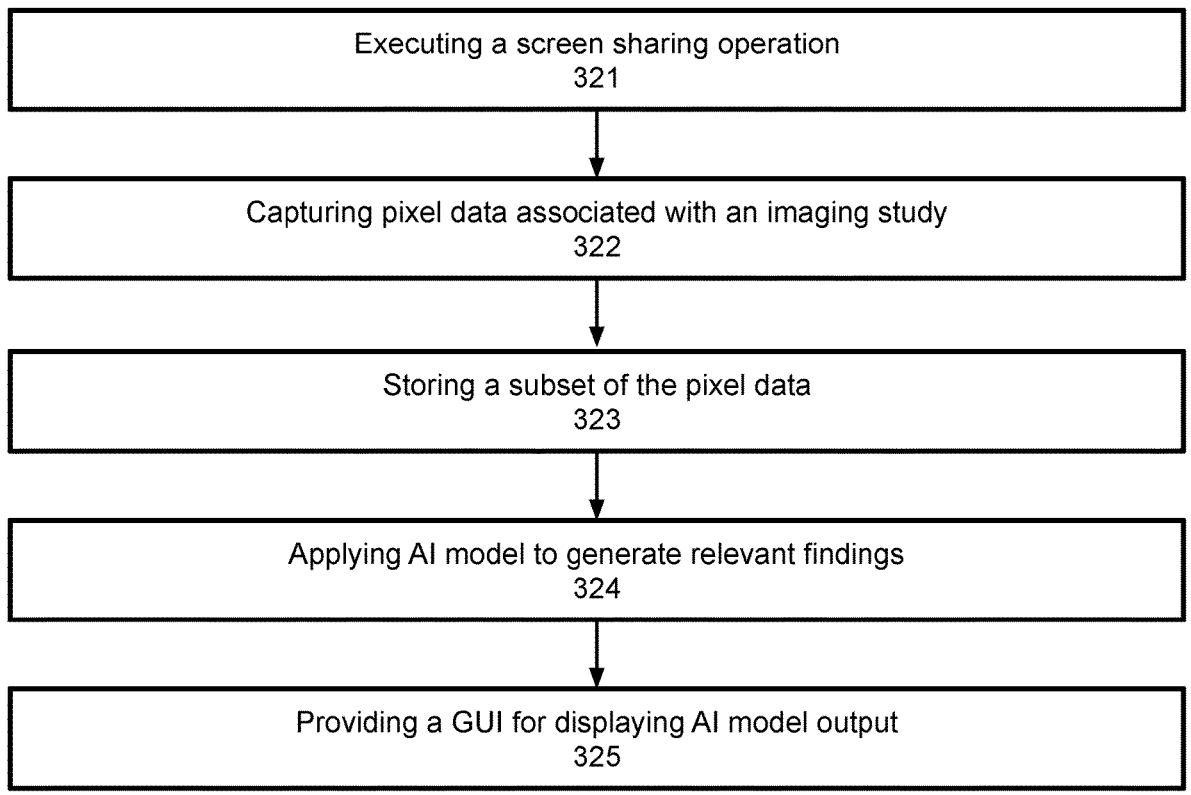
FIG. 3B illustrates an exemplary process for real-time analysis of practitioner imaging study reading characteristics according to one embodiment of the invention.

FIG. 3B illustrates an exemplary process for real-time analysis of practitioner imaging study reading characteristics according to one embodiment of the invention. The process comprises executing a screen sharing operation 321, capturing pixel data associated with an imaging study 322, storing a subset of the pixel data 323, applying an AI model to generate relevant findings 324, and providing a graphical user interface (GUI) for displaying the AI model output 325.

At step 321, the process may comprise executing a screen sharing operation. Executing the real-time screen sharing operation may comprise establishing a communicative connection between a real-time screen sharing application being executed on an imaging study review workstation and the remote server. The real-time screen sharing operation may be executed through a web-browser. The screen sharing operation may comprise screen scraping capabilities.

At step 322, the process may comprise capturing pixel data associated with an imaging study. Pixel data may be captured via the real-time screen sharing operation. Capturing pixel data may comprise executing a real-time screen scraping operation. Capturing pixel data may comprise use of screen capture APIs. Capturing pixel data may comprise obtaining pixel values associated with an imaging study as the study is being reviewed by a practitioner (e.g. radiologist). Capturing pixel data may comprise obtaining pixel values associated with a user interface displayed on a display associated with the imaging study review workstation. Capturing pixel data may comprise obtaining pixel values associated with at least a portion of the displayed user interface including at least the portion of the user interface where the imaging study is displayed and/or where a user interacts to document relevant findings associated with the review. In this way, the process may be implemented with any radiology review software without the need for modification of the radiology review software or integration therewith. That is, via the screen sharing and capture described herein, the process enables AI review of imaging studies as they are currently being reviewed regardless of the radiology software used to review the imaging studies and without direct access to the raw image files being reviewed. Capturing pixel data may comprise implementing privacy-preserving mechanisms to ensure compliance with medical data regulations such as HIPAA.

At step 323, the process may comprise storing a subset of the pixel data. Storing a subset of the pixel data may comprise storing pixel values associated with a region of interest within the user interface associated with the imaging study review workstation. Storing a subset of pixel data may comprise updating the stored subset of pixel values over time as images displayed in the user interface associated with the imaging study review workstation change over time as a result of a user reviewing the imaging study (e.g. scrolling through different images of the imaging study). Storing a subset of pixel data may comprise generating relevant images from stored pixel values and storing the relevant images in a cache. The cached images may be cached in a secure database or caching system. In one aspect, the relevant images comprise images associated with discrepancies identified between AI model findings and user documented findings. These images associated with discrepancies may be later used for model retraining purposes and/or for presentation to the imaging study reviewer. In one aspect, the relevant images comprise images identified for use in retraining of an AI model.

At step 324, the process may comprise applying an AI model to generate relevant findings. The AI model may comprise a model trained on a dataset of radiology images such that the model is capable of identifying abnormalities within an imaging study. The AI model may be trained using machine learning techniques such as neural networks and/or deep learning. The AI model may be trained using at least one of supervised learning, unsupervised learning, semi-supervised learning, reinforcement learning, and federated learning. The AI model may be trained using at least one of linear regression, logistic regression, decision trees, random forest algorithm, support vector machines, Naive Bayes algorithm, random walk algorithm, k-nearest neighbor algorithm, k-means clustering, and Markov models. The AI model may be trained using labeled images. The labeled images may comprise labels (e.g. labeled pixels) for at least one of anatomical structures, air or fluid, and abnormalities. These training approaches are merely exemplary and other training approaches/techniques may be used without departing from the scope of the invention as would be apparent to one of ordinary skill in the art.

The AI model may be stored within the memory of the web browser. The AI model may generate output associated with at least one of anatomy being reviewed or present in the imaging study, locations of identified items of interest, measurements of identified items of interest, and indicators associated with identified items of interest. In one aspect, the items of interest may comprise at least one of anatomical abnormalities, lesions, fractures, tears, tumors, masses, protrusions, and image artifacts. The AI model may employ at least one of image segmentation, image registration, image transformation, thresholding, contrast enhancement, noise reduction, filtering, and edge detection techniques to identify at least one of anatomical features and abnormalities present in the images. The indicators may comprise at least one of bounding boxes, outlines, color, and shading of the item of interest wherein the indicators are to be displayed in an overlaid fashion to indicate the location of the item of interest within the images being reviewed. The AI model may employ at least one of natural language processing (NLP) and large language models (LLM) to generate clinically relevant text for documenting AI generated findings.

The AI model may derive user documented findings from the captured pixel values. Applying the AI model may comprise applying at least one of text analytics, Natural Language Processing (NLP) techniques, and large language model (LLM) techniques to pixel values associated with user documented findings in order to interpret diagnostic terminology used by practitioners. The AI model may evaluate the user documented findings to determine similarities and/or differences between the user documented findings and AI model based findings (e.g. if the user has identified the same findings as the AI model). In one aspect, the process may further comprise generating at least one of real-time efficiency and quality metrics based on a comparison of user documented findings with AI model based findings.

In one aspect, the applied AI model(s) may be retrained based on at least one of the captured pixel values, user documented findings and the AI generated findings. Retraining of the AI model may include the collection of decentralized data from various nodes that represent unique sources of clinical information (e.g. from a plurality of distinct imaging study review workstations). This decentralized data is then aggregated for use in retraining the AI model to enhance the AI model's learning and performance. In one aspect, retraining may comprise federated learning, where the AI model is updated through a central server that coordinates the training process across multiple nodes. For example, each node may train a local model based on its own data, and the central server subsequently updates the central model by aggregating the improvements from all nodes, thereby preserving data privacy while benefiting from diverse data sources.

At step 325, the process may comprise providing a graphical user interface (GUI) for displaying the AI model output. The GUI may comprise at least one wherein the at least one user interface (UI) element for displaying AI model output. The GUI may comprise an overlay to be displayed on a display associated with the imaging study review workstation. The overlay may display the AI model output layered on top of an underlying displayed graphical user interface generated by the imaging study review workstation. The GUI may comprise at least one element for displaying an analytics dashboard to display at least one of user efficiency, quality metrics, insights and recommendations based on statistical comparisons of current and historical study reading characteristics.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components or the like may be and/or comprise hardware and/or software as described herein. For example, the screen capture/analysis software 103, AI analysis system 104, quality analysis system 105, and caching system 106 and subcomponents of any of these systems may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
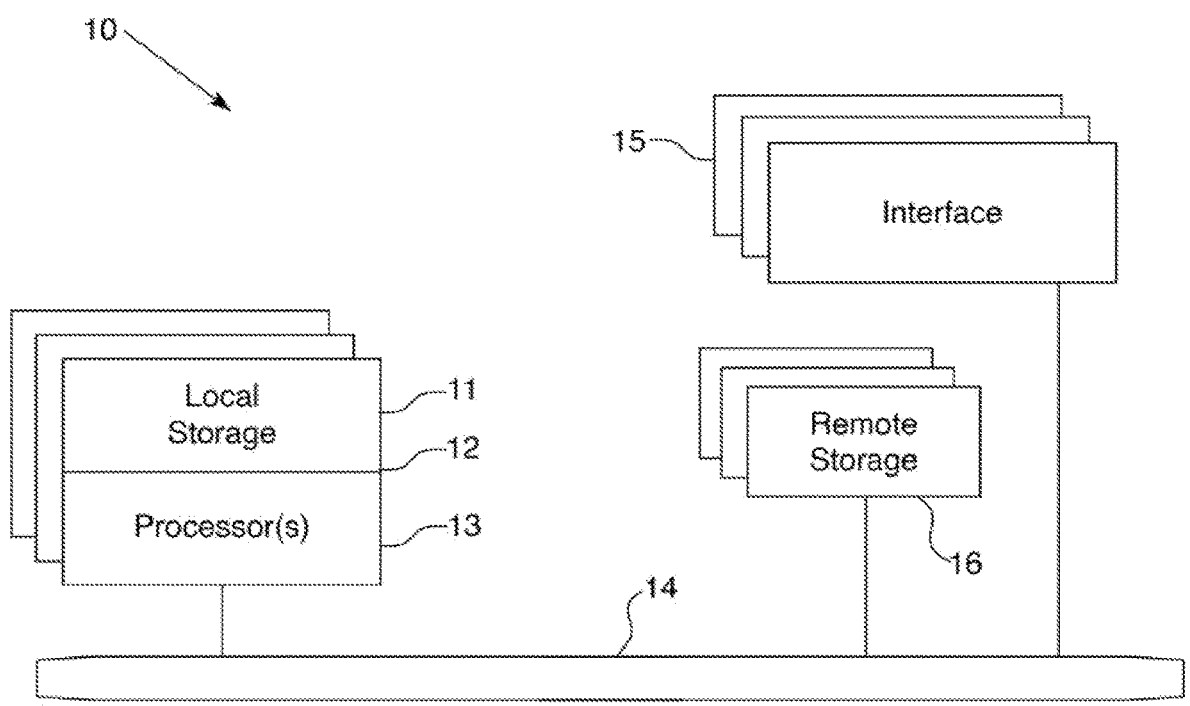
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
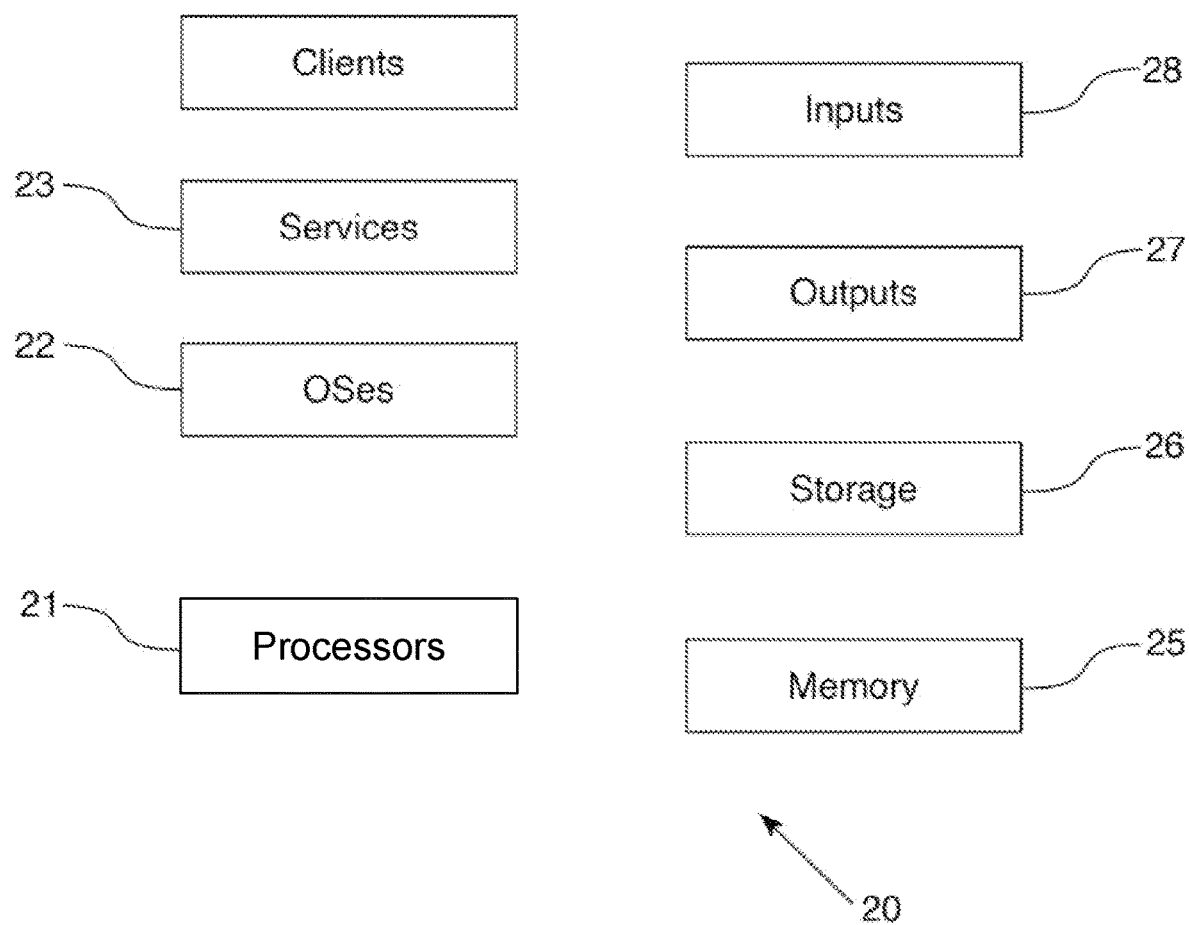
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
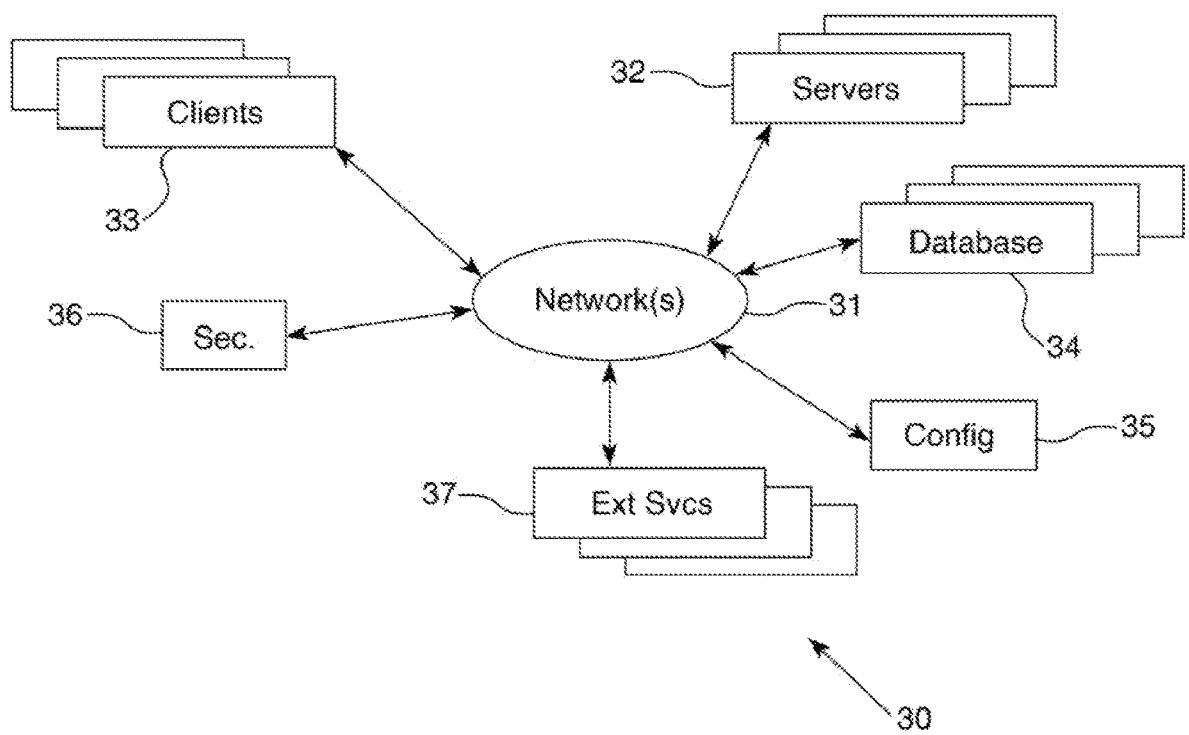
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
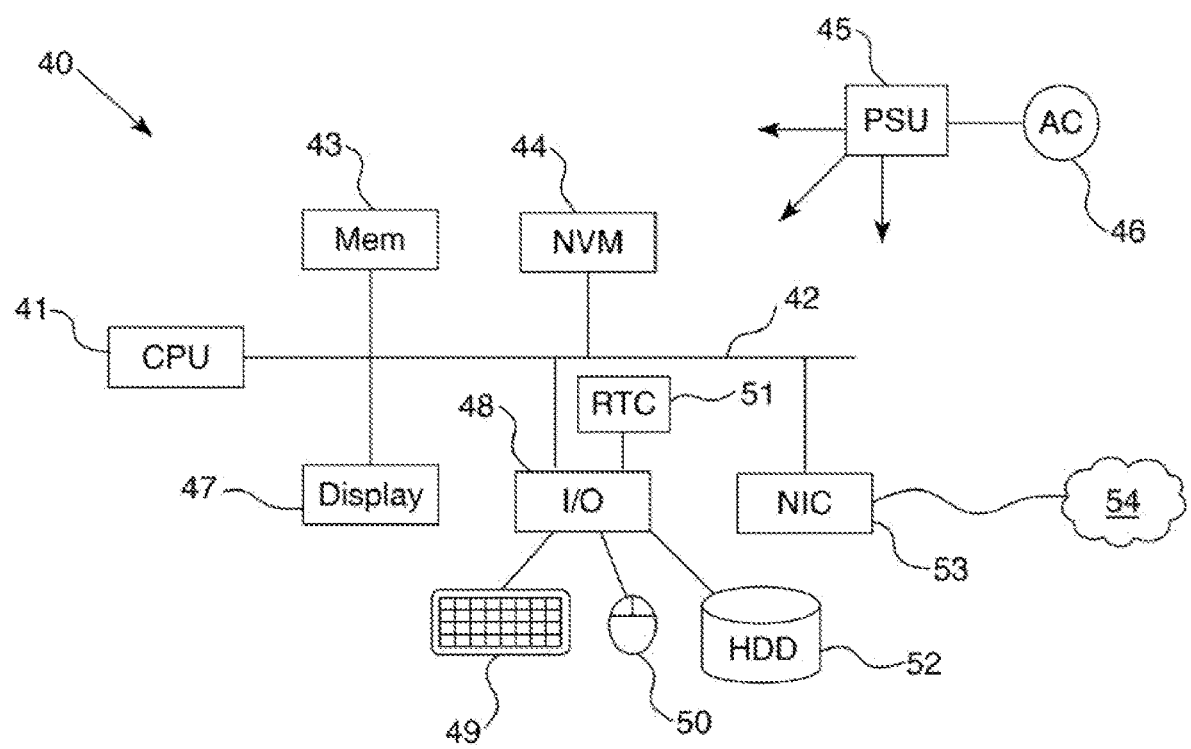
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for real-time artificial intelligence (AI) assessment of radiology imaging studies without direct access to the raw images, the computer implemented method comprising:
   executing a real-time screen sharing operation to share screen information between an imaging study review workstation and a remote server;
   capturing pixel data from the imaging study review workstation using a screen capture operation, wherein capturing pixel data comprises executing a real-time screen scraping operation to obtain pixel values associated with a user interface displayed on a display associated with the imaging study review workstation;
   storing a subset of the pixel data obtained over time in a storage cache;
   applying an artificial intelligence (AI) model to the stored pixel values, the AI model executed within a web browser application running on the imaging study review workstation, the AI model generating output associated with clinically relevant findings determined from the stored pixel values; and
   providing at least one graphical user interface (GUI) element for displaying the AI model output, the GUI element comprising an overlay to be displayed on a display associated with the imaging study review workstation wherein the overlay displays the AI model output layered on top of an underlying display graphical user interface generated by the imaging study review workstation.

2. The computer implemented method according to claim 1, wherein executing the real-time screen sharing operation comprises establishing connection between a real-time screen sharing application being executed on an imaging study review workstation and the remote server.

3. The computer implemented method according to claim 1, wherein the AI model is stored within the memory of the web browser.

4. The computer implemented method according to claim 1, wherein the AI model generates output associated with at least one of anatomy being reviewed or present in the imaging study, locations of identified items of interest, measurements of identified items of interest, and indicators associated with identified items of interest.

5. The computer implemented method according to claim 4, wherein the identified items of interest comprise at least one of anatomical abnormalities, lesions, fractures, tears, tumors, masses, protrusions, and image artifacts.

6. The computer implemented method according to claim 4, wherein the indicators comprise at least one of bounding boxes, outlines, color, and shading of the item of interest.

7. The computer implemented method according to claim 1, wherein the screen scraping obtains pixel values associated with user documented findings of the imaging study.

8. The computer implemented method according to claim 7, further comprising applying at least one of text analytics, Natural Language Processing (NLP) techniques, and large language model (LLM) techniques to the pixel values associated with user documented findings to interpret diagnostic terminology used by practitioners.

9. The computer implemented method according to claim 8, wherein the AI model evaluates the user documented findings to evaluate if the user has identified the same findings as the AI model.

10. The computer implemented method according to claim 7, further comprising caching relevant images derived from stored pixel values, the relevant images cached in a secure database or caching system, the relevant images comprising images associated with discrepancies identified between AI model findings and user documented findings.

11. The computer implemented method according to claim 7, further comprising generating at least one of real-time efficiency and quality metrics based on a comparison of user documented findings with AI model based findings.

12. The computer implemented method according to claim 1, wherein the stored subset of pixel values comprises pixel values associated with a region of interest within the user interface associated with the imaging study review workstation, wherein the stored subset of pixel values is updated over time as images displayed in the user interface associated with the imaging study review workstation change over time as a result of a user reviewing the imaging study.

13. The computer implemented method according to claim 1, wherein the AI model employs at least one of natural language processing (NLP) and large language models (LLM) to generate clinically relevant text for documenting AI generated findings.

14. The computer implemented method according to claim 1, further comprising retraining of the AI model using an aggregation of decentralized data collected from a plurality of nodes that represent unique sources of clinical information.

15. The computer implemented method according to claim 1, wherein the at least one GUI element comprises a GUI element for displaying an analytics dashboard to display user efficiency and quality metrics and provide insights and recommendations based on statistical comparisons of current and historical reading characteristics.

16. The computer implemented method according to claim 1, the user interface displayed on a display associated with the imaging study review workstation comprising at least one user interface element allowing radiologists to view images of a radiologic study and document findings.

17. The computer implemented method according to claim 1, wherein capturing pixel data further includes implementing privacy-preserving mechanisms to ensure compliance with medical data regulations.

18. The computer implemented method according to claim 1, the AI model employing at least one of image segmentation, image registration, image transformation, thresholding, contrast enhancement, noise reduction, filtering, and edge detection techniques to identify at least one of anatomical features and abnormalities present in the images.

19. A computing system for real-time artificial intelligence (AI) assessment of radiology imaging studies without direct access to the raw images, the computing system comprising:
- at least one computing processor; and
- memory comprising instructions that, when executed by the at least one computing processor, enable the computing system to:
  - execute a real-time screen sharing operation to share screen information between an imaging study review workstation and a remote server;
  - capture pixel data from the imaging study review workstation using a screen capture operation, wherein capturing pixel data comprises executing a real-time screen scraping operation to obtain pixel values associated with a user interface displayed on a display associated with the imaging study review workstation;
  - store a subset of the pixel data obtained over time in a storage cache;
  - apply an artificial intelligence (AI) model to the stored pixel values, the AI model executed within a web browser application running on the imaging study review workstation, the AI model generating output associated with clinically relevant findings determined from the stored pixel values; and
  - provide at least one graphical user interface (GUI) element for displaying the AI model output, the GUI element comprising an overlay to be displayed on a display associated with the imaging study review workstation wherein the overlay displays the AI model output layered on top of an underlying display graphical user interface generated by the imaging study review workstation.

20. A non-transitory computer readable medium comprising instructions that when executed by a processor enable the processor to execute a series of steps comprising:
- executing a real-time screen sharing operation to share screen information between an imaging study review workstation and a remote server;
- capturing pixel data from the imaging study review workstation using a screen capture operation, wherein capturing pixel data comprises executing a real-time screen scraping operation to obtain pixel values associated with a user interface displayed on a display associated with the imaging study review workstation;
- storing a subset of the pixel data obtained over time in a storage cache;
- applying an artificial intelligence (AI) model to the stored pixel values, the AI model executed within a web browser application running on the imaging study review workstation, the AI model generating output associated with clinically relevant findings determined from the stored pixel values; and
- providing at least one graphical user interface (GUI) element for displaying the AI model output, the GUI element comprising an overlay to be displayed on a display associated with the imaging study review workstation wherein the overlay displays the AI model output layered on top of an underlying display graphical user interface generated by the imaging study review workstation.

* * * * *